(12) United States Patent
Todoroki

(10) Patent No.: US 9,451,073 B2
(45) Date of Patent: *Sep. 20, 2016

(54) TERMINAL APPARATUS AND METHOD OF CONTROLLING TERMINAL APPARATUS WITH MULTI-TASKING FEATURES

(71) Applicant: SONY MOBILE COMMUNICATIONS INC., Tokyo (JP)

(72) Inventor: Kaneo Todoroki, Kanagawa (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,107

(22) Filed: Jun. 24, 2015

(65) Prior Publication Data

US 2015/0296071 A1 Oct. 15, 2015

Related U.S. Application Data

(63) Continuation of application No. 12/894,907, filed on Sep. 30, 2010.

(60) Provisional application No. 61/305,392, filed on Feb. 17, 2010.

(51) Int. Cl.
*G06F 3/00* (2006.01)
*G06F 17/00* (2006.01)
(Continued)

(52) U.S. Cl.
CPC ........ *H04M 1/72522* (2013.01); *G06F 3/0481* (2013.01); *G06F 3/04845* (2013.01); *G06F 9/461* (2013.01); *G06F 9/4843* (2013.01); *G06F 9/54* (2013.01); *G06F 2203/04803* (2013.01)

(58) Field of Classification Search
CPC .............................. G06F 9/54; G06F 3/04845
USPC ........................................... 719/310; 715/273
See application file for complete search history.

(56) References Cited

U.S. PATENT DOCUMENTS 5,884,160 A * 3/1999 Kanazaki ...................... 455/413
RE36,801 E * 8/2000 Logan et al. .................. 348/571
(Continued)

FOREIGN PATENT DOCUMENTS

JP 2008-165735 A 7/2008

OTHER PUBLICATIONS

Peder Nordgren, Development of a touch screen interface for Scania Interactor, Apr. 10, 2007.*

(Continued)

*Primary Examiner* — Lechi Truong
(74) *Attorney, Agent, or Firm* — Oblon, McClelland, Maier & Neustadt, L.L.P.

(57) ABSTRACT

A terminal apparatus, and associated method, stores in memory a plurality of application programs. A controller executes the plurality of application programs in a multi-tasking arrangement. When one of the application programs is replaced in the foreground with another application program, an image of the former application program while in an active state is stored in memory. That image is then used as part of a graphical user interface to provide an indication to a user of the other applications that are presently running, and the state of execution of the other application programs when last operating in the foreground.

23 Claims, 12 Drawing Sheets

(51) Int. Cl.
*H04M 1/725* (2006.01)
*G06F 9/54* (2006.01)
*G06F 3/0484* (2013.01)
*G06F 3/0481* (2013.01)
*G06F 9/46* (2006.01)
*G06F 9/48* (2006.01)

(56) References Cited

U.S. PATENT DOCUMENTS

| | | | |
|---|---|---|---|
| 7,111,044 B2 * | 9/2006 | Lee | H04L 12/1827 709/204 |
| 7,685,535 B2 | 3/2010 | Todoroki et al. | |
| 2003/0115595 A1 * | 6/2003 | Stevens et al. | 725/32 |
| 2005/0164688 A1 * | 7/2005 | Satake | 455/418 |
| 2005/0210406 A1 * | 9/2005 | Biwer | G06Q 10/10 715/804 |
| 2005/0267676 A1 * | 12/2005 | Nezu | G06F 3/04883 701/532 |
| 2007/0273926 A1 * | 11/2007 | Sugiyama et al. | 358/1.18 |
| 2007/0283409 A1 * | 12/2007 | Golden | H04H 60/33 725/139 |
| 2009/0167716 A1 * | 7/2009 | Wang et al. | 345/173 |
| 2009/0265628 A1 | 10/2009 | Bamford et al. | |
| 2010/0277429 A1 | 11/2010 | Day et al. | |
| 2011/0179361 A1 * | 7/2011 | Cardarelli et al. | 715/744 |

OTHER PUBLICATIONS

George Buchanan, Improving Mobile Internet Usability, May 2001.

* cited by examiner

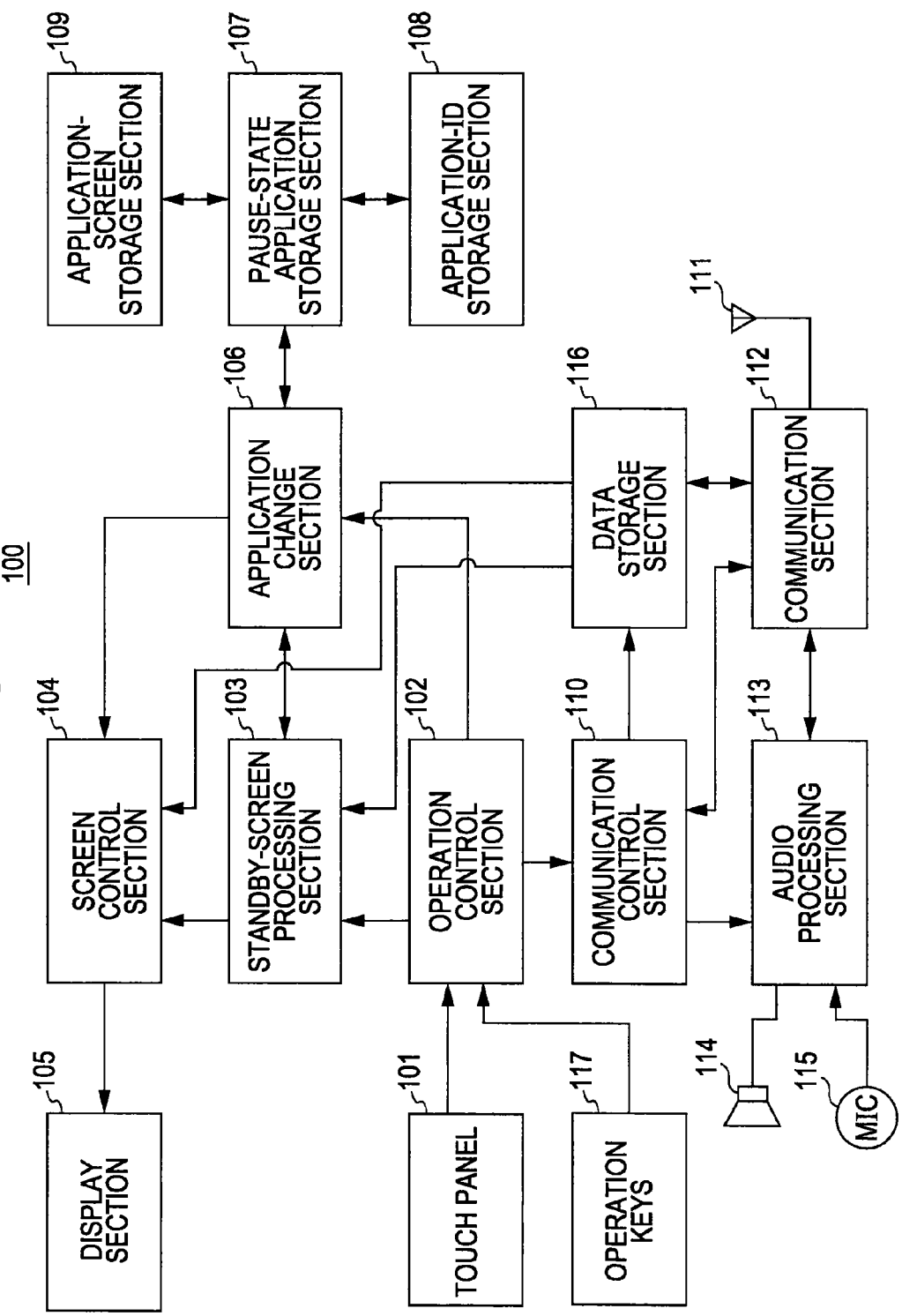

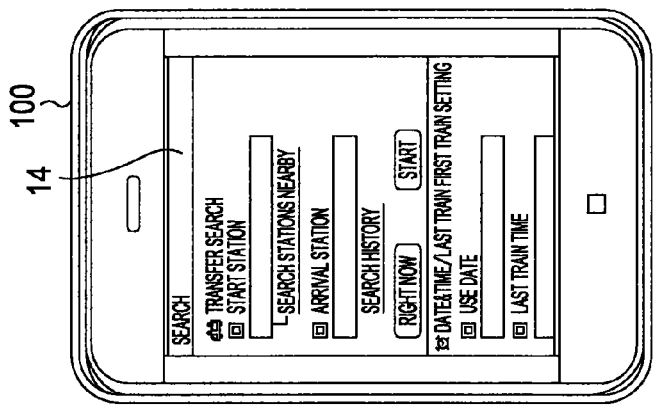
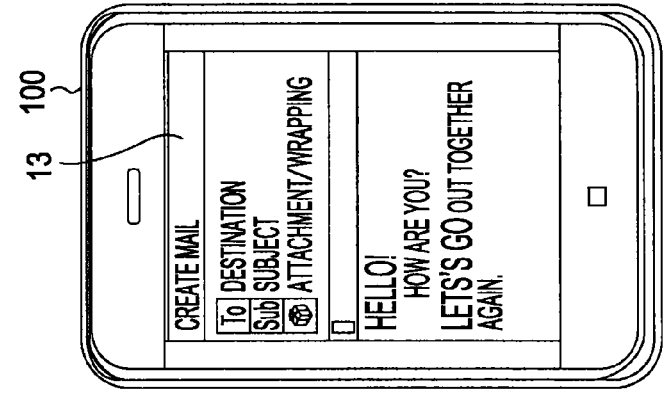
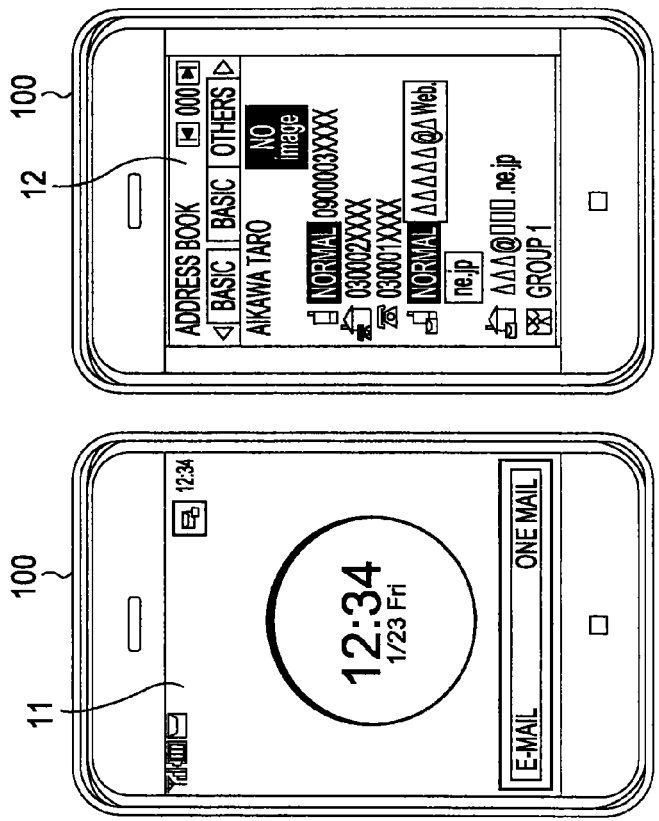

| APPLICATION-ID | LINK TO SCREEN IMAGE |
|---|---|
| 105 | ADDRESS 1000 |
| 233 | ADDRESS 2000 |
| 45 | ADDRESS 3000 |
|  |  |
|  |  |

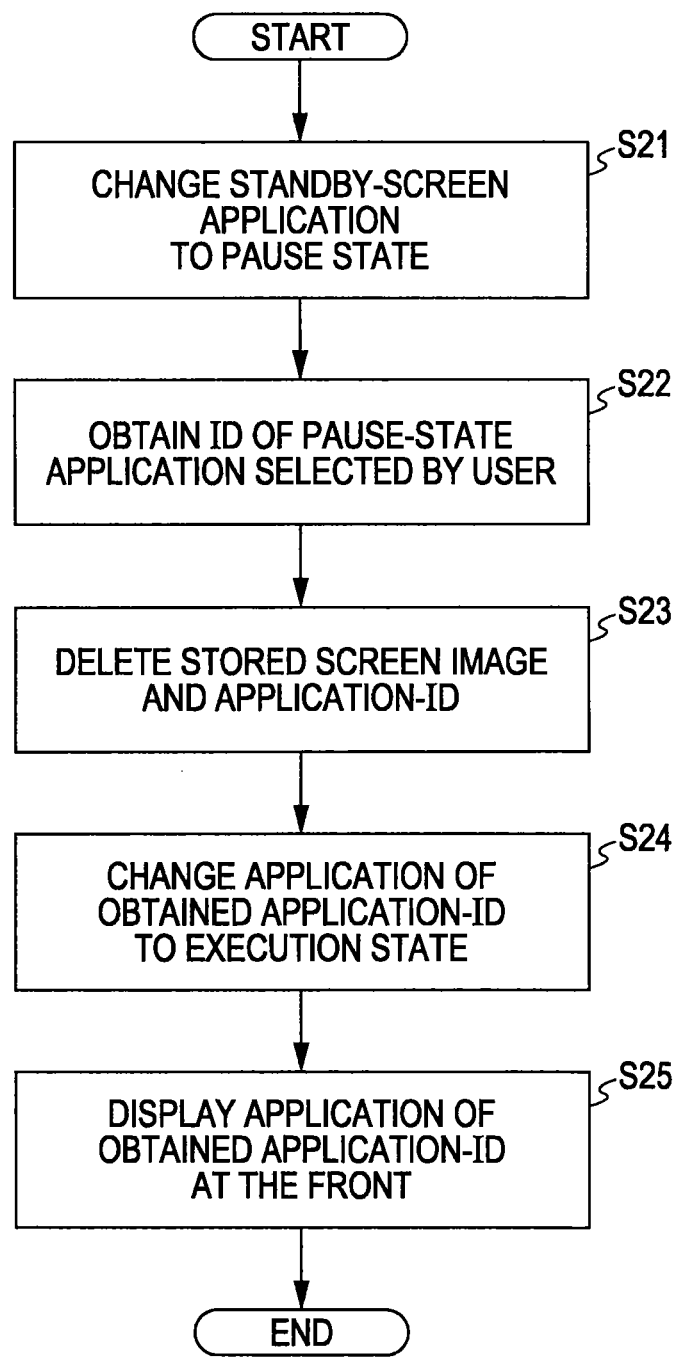

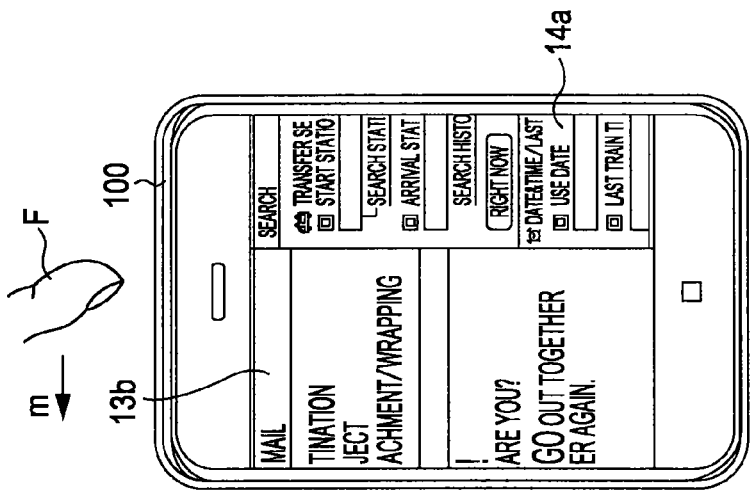
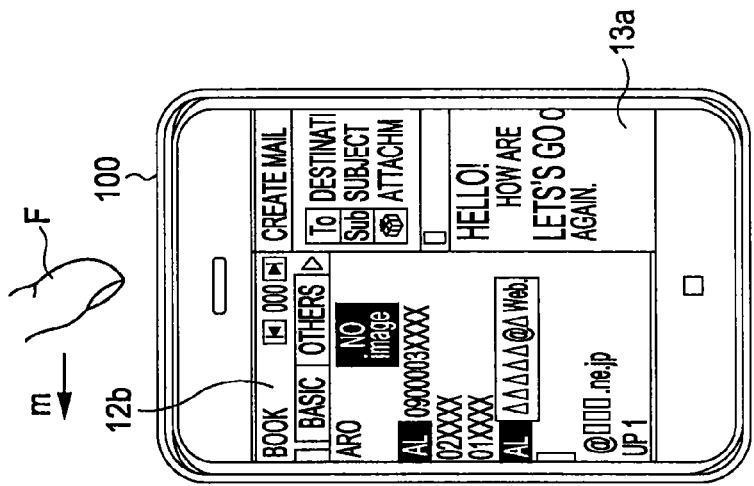
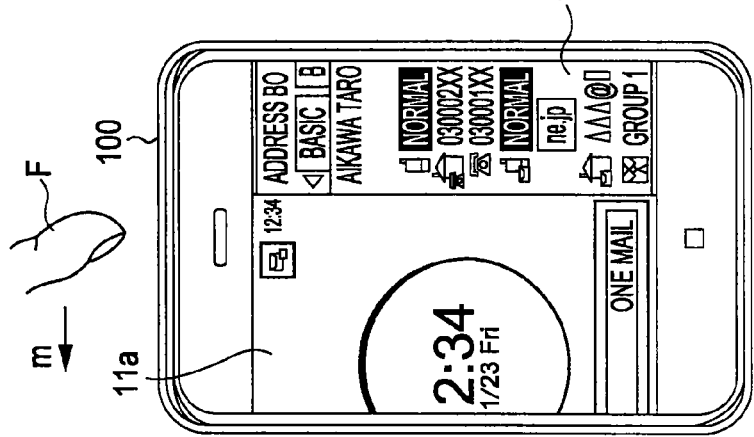

TERMINAL APPARATUS AND METHOD OF CONTROLLING TERMINAL APPARATUS WITH MULTI-TASKING FEATURES

CROSS REFERENCE TO RELATED APPLICATION

The present application is a continuation application of U.S. patent application Ser. No. 12/894,907, filed Sep. 30, 2010, now U.S. Pat. No. 9,104,468, which claims the benefit of the earlier filing date of U.S. Provisional Application Ser. No. 61/305,392, filed in the USPTO on Feb. 17, 2010, the entire contents of which being incorporated herein by reference.

BACKGROUND

1. Field of the Invention

The present invention relates to a terminal apparatus and a control method thereof suitably applied to a terminal apparatus provided with a display panel, for example a mobile-telephone terminal apparatus, etc. More particularly, the present invention relates to a technique to be applied to a terminal apparatus including a plurality of applications.

2. Description of the Related Art

Mobile-telephone terminal apparatuses tend to have multiple functions more and more these days, and one terminal apparatus includes many application programs, allowing a user to perform the many application programs. For example, the application programs include a standby-screen display application program, a telephone-directory display application program, an electronic-mail display application program, an application program connecting to and displaying an Internet site, etc. Moreover, these application programs are sometimes downloaded by a user in addition to the application programs that are provided in the terminal apparatus in advance.

When these application programs are executed, a multi-tasking function is sometimes performed. That is to say, a plurality of application programs are started at the same time, and multi-tasking processing, in which a program to be displayed is changed among the plurality of application programs started simultaneously, is performed.

At the time of multi-tasking processing, for example an icon indicating that the multi-tasking function that is in execution is displayed on a screen, and a change is made to display a display screen of another application program by a predetermined operation, such as selection of the icon, etc. Alternatively, a proposal has been made that a list of names of started applications is displayed, and an application to be changed is selected by a user operation from the list.

A description is given of an example of the case where an application being paused is iconized and displayed when multi-tasking processing is performed in Japanese Unexamined Patent Application Publication No. 2008-165735.

SUMMARY

Incidentally, as described above, when multi-tasking processing is performed, there is a problem, as recognized by the present inventors, in that even if it is understood that a multi-tasking function is being executed by an icon, etc., it is difficult to understand which application is running among applications that are not being displayed. That is to say, there is a problem in that the user had to correctly memorize functions of individual icons. Also, if the names of applications are displayed, it is necessary for the user to correctly memorize what the user has been doing with the application immediately before a screen change. If the user has not memorized the operation, the user has to display each application whose application name is included in the list one-by-one on the screen, and then has to remember the work in process. Thereby, it takes a lot of time and effort.

Also, when a terminal apparatus is configured as a relatively small-sized portable terminal apparatus, such as a mobile-telephone terminal apparatus, etc., a calculation processing section executing application programs often does not have a high calculation processing power compared with a personal computer, etc. This is because it is sometimes not preferable for the terminal apparatus to have a very high calculation processing power in terms of not only cost reduction of the terminal apparatus, but also necessity of lowering power consumption, etc.

Accordingly, the terminal apparatus often has insufficient calculation processing power for performing the above-described multi-tasking processing. That is to say, if a plurality of application programs are started at the same time, the load for simultaneously starting and processing individual applications becomes large, and it might take too much time to change display screens in some cases.

The present invention has been made in view of these points. It is desirable to allow the processing in the case of simultaneously starting a plurality of applications to reduce the load of the calculation processing section and to be operated with user-friendliness.

According to an embodiment of the present invention, there is provided a method of controlling a terminal apparatus storing a plurality of application programs and displaying screens by executing the stored application programs. The method including the steps of, while in a state of displaying a screen of a first application program, if an operation is performed to display a screen of a second application program, storing image data generating a screen of the first application program in execution and execution-state data of the first application program in execution; and if an application-program-change operation is performed while the screen of the second application program is displayed, performing control processing to display the image data stored by the step of storing, and to restart the first application program on the basis of the execution-state data stored by the step of storing.

As a consequence, if processing is changed from one application program to another application program, an execution screen of the application program before the change is stored. And if an operation is performed to change the processing to the former application program again, the stored execution screen is displayed, and thus it becomes possible to display the screen of the former application program without waiting for a restart of the application program.

Moreover, if an operation is performed to change a plurality of application programs, it becomes possible to display an execution screen of the application program after the change without actually executing the application program. Accordingly, it becomes possible to smoothly change application programs without starting a plurality of application programs at the same time. Also, it is not necessary to simultaneously start a plurality of application programs, and thus it becomes possible to reduce the load for calculation processing, etc., in individual sections of the apparatus.

BRIEF DESCRIPTION OF THE DRAWINGS

FIG. 1 is a block diagram illustrating an example of a configuration of a terminal apparatus according to an embodiment of the present invention;

FIGS. 2A, 2B, 2C, and 2D are explanatory diagrams illustrating an example of a display of a terminal apparatus according to an embodiment of the present invention;

FIG. 6 is a flowchart illustrating an example of processing at the time of restarting paused application according to an embodiment of the present invention;

FIGS. 7A, 7B, and 7C are explanatory diagrams illustrating an example of a display change between a standby screen and an application screen according to an embodiment of the present invention;

DESCRIPTION OF THE EMBODIMENTS

Figures 3, 4:
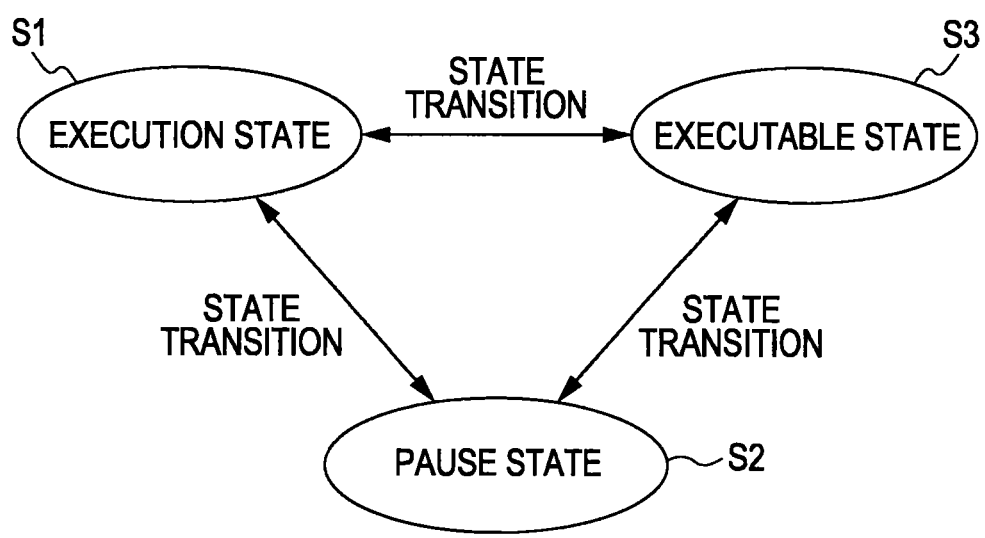
FIG. 3 is an explanatory diagram illustrating an example of a link-information table according to an embodiment of the present invention.
FIG. 4 is an explanatory diagram illustrating an example of status transition according to an embodiment of the present invention.

A description will be given of an embodiment of the present invention in the following order with reference to the accompanying drawings.
1. Configuration of terminal apparatus (FIG. 1)
2. Description of application and display example thereof and execution state (FIGS. 2 to 4)
3. Description of processing at the time of changing applications (FIGS. 5 to 10)
4. Variation 1 (FIG. 11)
5. Variation 2 (FIG. 12)
6. Variation 3 (FIG. 13)
7. Other variations
   1. Configuration of Terminal Apparatus First, a description is given of an example of a configuration of a terminal apparatus according to an embodiment of the present invention with reference to FIG. 1.

The present embodiment is directed to a mobile-telephone terminal apparatus, as an example of a terminal apparatus.

Referring to the configuration in FIG. 1, a terminal apparatus 100 includes a touch panel 101. The touch panel 101 is disposed on (or integrated with) a display panel included in a display section 105, which collectively form a touch panel display. By touching the display panel with a user's finger, stylus, etc., the user performs operations.

Operation information detected by the touch panel 101 is supplied to an operation control section 102. Also, the terminal apparatus 100 has operation keys 117, and operation information of the operation keys 117 is also supplied to the operation control section 102.

The operation control section 102 controls operation of the terminal apparatus 100 through a suitable processing section on the basis of the operation information input by a user's operation. The operation control section includes a processing section, such as a programmable CPU, application specific integrated circuit, programmable array logic or the like, which performs the control operations as discussed herein. A standby-screen processing section 103 is a screen processing section of an application provided for a standby-screen function. In the present embodiment, applications in execution (meaning applications that are actively performing a process) are changed using the standby-screen processing section 103.

A screen control section 104 controls display on the display section 105. The display section 105 includes a display device, such as a liquid-crystal-image display panel, etc.

An application-change section 106 supplies information, such as image data of a pause-state application screen and an application ID, etc., in response to a request from the standby-screen processing section 103. Also, the application-change section 106 requests a pause-state application storage section 107 described later to update storage information of a pause-state application. In this regard, here, image data of a display screen when each application is performed is referred to as a screen image.

The pause-state-application storage section 107 saves, reads, updates, and deletes a pause-state-application screen image and an application ID using an application-screen storage section 109 and an application-ID storage section 108 individually described later. Also, the pause-state-application storage section 107 supplies storage information of an application screen image and an application ID to the application-change section 106 in response to the application-change section 106.

The application-ID storage section 108 saves, reads, updates, and deletes an application ID, which is on or more symbols uniquely assigned to each application, into or from a memory. In this regard, either a volatile memory or a nonvolatile memory (both of which being non-transitory computer storage devices) may be used for the computer readable medium.

When an application in an execution state goes to a pause state (where the execution of instruction in the main program is halted, although instructions that maintain the pause state or watch for an occurrence of an external event may be executed), the application-screen storage section 109 saves an application screen image at that time into the memory. Also, the application-screen storage section 109 reads, updates, and deletes a screen image saved in the memory in response to the request from the pause-state application storage section 107. Either a volatile memory or a nonvolatile memory may be used for the memory used by the application-screen storage section 109. Also, the application-ID storage section 108 and the application-screen storage section 109 may use a common memory by dividing the memory into individual storage areas.

A description is now given of a wireless telephone function implemented by the terminal apparatus 100. The terminal apparatus 100 includes a communication control section 110, and a communication section 112 performs wireless communication under the control of the communication control section 110. An antenna 111 is connected to the communication section 112 for performing wireless communication with a wireless-telephone base station, etc. An audio signal obtained by reception of the communication section 112 is supplied to an audio processing section 113. The audio signal having been subjected to sound demodulation processing, etc., is supplied to a speaker 114, and is output. Also, an audio signal obtained by a microphone 115 is supplied to the audio processing section 113, is subjected to processing, such as digital conversion, modulation, etc., and is supplied to the communication section 112 to be transmitted wirelessly. Also, when the communication section 112 receives various kinds of data, the received data is supplied to a data storage section 116, and is stored in a memory held in the data storage section 116. Application programs to be executed in the terminal apparatus 100 are also stored in the data storage section 116. Some of the application programs stored in the data storage section 116 are programs that are provided in the terminal apparatus 100 in advance, and Some of the application programs are downloaded through the communication section 112.

In this regard, the configuration shown in FIG. 1 is a functional block diagram of the terminal apparatus 100. Thus, an actual circuit configuration is not limited to the configuration including the individual sections shown in FIG.

1. For example, the control section is divided into the screen control section 104, the operation control section 102, and the communication control section 110. However, these control sections may be configured as one control means.

2. Description of Application and Display Example Thereof and Execution State

Next, a description will be given of an execution state of an application program in the terminal apparatus 100 with reference to FIGS. 2 to 4.

FIGS. 2A, 2B, 2C, and 2D are diagrams illustrating an example of display of the display section 105 when the terminal apparatus 100 according to the present embodiment executes various kinds of application programs.

An application execution screen 11 shown in FIG. 2A is a display example in the case of a standby screen. In this example, current time and date is shown in the middle of the screen, and various kinds of guides indicating an operation state of the terminal apparatus are displayed at the upper-end part. For example, a reception state of a radio wave from a base station, the amount of remaining battery, an indication having an unread mail are displayed. Also, "E-mail one mail" is displayed at the lower side of the screen, indicating that there is a mail reception.

An application execution screen 12 shown in FIG. 2B is a display example in the case of executing an application program of an address book. In this example, various kinds of storage data, such as a telephone number, an address, etc., on a specific person is displayed.

An application execution screen 13 shown in FIG. 2C is a display example in the case of executing an application program of an electronic mail. In this example, a mail text, a destination, etc., at the time of creating an electronic mail are displayed.

An application execution screen 14 shown in FIG. 2D is a display example in the case of performing an application program of accessing a predetermined Web page on the Internet. In this example, a search screen for a transfer guide to a destination is displayed.

The applications and screens in FIGS. 2A to 2D are only examples, and display of an application program in the present embodiment is not limited to these examples.

These application programs are selected, for example by operation of a touch panel 101 or operation keys 117. Although not shown in the figure, for example, a list of application programs are displayed on the screen, and processing to allow the user to make a selection is performed. Alternatively, for a part of the functions, such as mail, the Internet, etc., the applications are started by operating dedicated keys assigned to those functions.

In the present embodiment, when these application programs are stored in the data storage section 116, application IDs are given. Also, as described later, screen images of individual application programs are saved in the application-screen storage section 109 as necessary. If saved, an address for linking to a saved screen image is stored.

That is to say, for example, as shown in FIG. 3, an address for linking to a screen image of an application is stored in the application-ID storage section 108 for each application ID.

In this regard, here it is assumed that an application-screen display area is fixed. However, if a display area has a different size for each application, screen-size information may be added to the table in FIG. 3, and the screen-size information may be stored in order to allow being indicated at display time.

Also, if the other information indicating an execution state immediately before pausing an application is obtained, the information on the execution state is also stored. For example, if an address book is paused, information on whose address book has been opened is stored. Also, if a mail function is paused, information on a mail text in process of being input, etc., is stored.

Also, in the terminal apparatus 100 according to the present embodiment, as states on execution of each application program, an execution state, an executable state, and a pause state are provided.

That is to say, for example, as shown in FIG. 4, it is possible to change individual states among the execution state S1, the pause state S2, and the executable state S3. The execution state S1 is a state in which the screen control section 104, etc., has started executing the corresponding application program in the terminal apparatus 100. The pause state S2 is a state in which the execution of that application program is paused. Also, the executable state S3 is a state in which the application program can be changed to an execution state. The executable state is a state in which a saved screen image is displayed, and in the process of starting processing of the application program having displayed the screen. In this regard, the executable state may be omitted, and states may be changed only between the execution state S1 and the pause state S2.

3. Description of Processing at the Time of Changing Applications

Next, a description will be given of an example of processing at the time of changing application programs in the terminal apparatus 100 according to the present embodiment.

Figure 5:
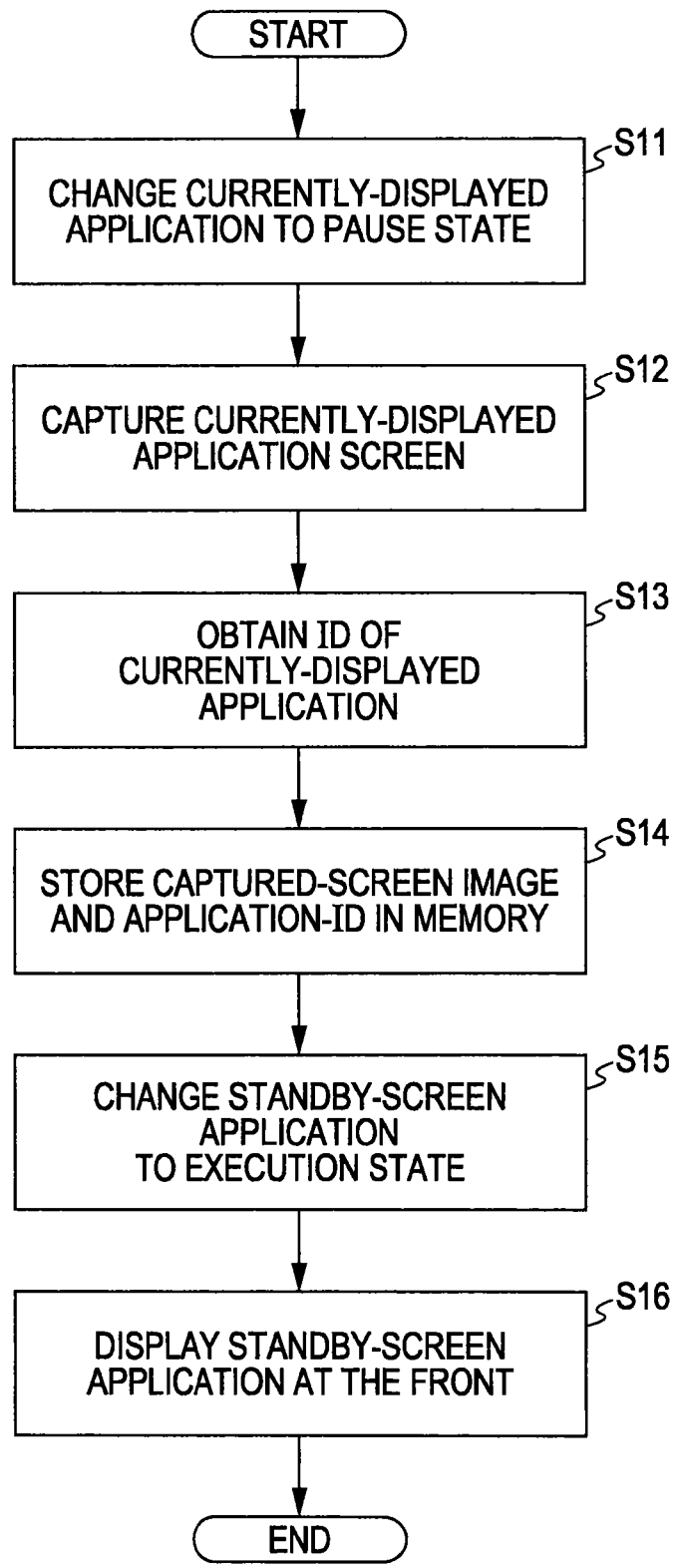
FIG. 5 is a flowchart illustrating an example of processing at the time of changing applications according to an embodiment of the present invention.

A flowchart in FIG. 5 illustrates an example of processing in which an instruction to change to another application is given by a user operation while a certain application program is in execution.

The example in FIG. 5 is an example in which the user presses a standby button of the terminal apparatus 100 while using an application other than a standby application so as to change to a standby screen. The standby button may be displayed on the screen, or may be provided as a dedicated key in one of the operation keys 117.

A description will be given of the processing in FIG. 5. When the operation control section 102 detects operation of the standby button, the standby-screen processing section 103 changes a currently-displayed application program to a pause state (step S11). At this time, the screen control section 104 captures an execution-screen image of the application program immediately before the pause (step S12), and obtains the application ID of the application program to be paused (step S13). And the captured screen image and application-ID are stored into the application-ID-storage section 108 and the application-screen-storage section 109 under the control of the pause-state-application storage section 107 (step S14). At this time, link information to the screen image is also added.

When the processing up to that point is completed, the standby-screen application program, which is an application program to be newly started, is changed to be in an execution state (step S15), and the standby screen is displayed at the front of the screen of the display section 105 (step S16).

For example, in a state in which the address-book application shown in FIG. 2B is started, if an operation to change to the standby screen is performed, the screen image of the address book is saved, and the screen is changed to the standby screen shown in FIG. 2A.

Next, a description will be given of processing of restarting a pause-state application program that has been in a pause state with reference to a flowchart in FIG. 6.

The processing in FIG. 6 is started when the user selects a pause-state application to be restarted by performing touch operation on a screen displayed by the standby-screen application.

When the user selects an application to be restarted, the standby screen application is changed into a pause state (step S21). In this regard, in principle, when an application is paused, the processing shown by the flowchart in FIG. 5 is performed. However, in the case of only the standby-screen application, a screen image is not captured and stored.

Next, the ID of the pause-state application that the user has selected is obtained (step S22). And the screen image of the application ID is read from the application-screen storage section 109, and the screen image and the ID of the read pause-state application are deleted from the memory (step S23). And the processing to change the application program of the obtained application-ID to an execution state is started (step S24). Also, the screen image read from the application-screen storage section 109 is displayed at the front of the screen (step S25).

The change to an execution state in step S24 is a restart from a pause state. In a state of displaying a screen image read from the application-screen storage section 109, when the screen control section 104 has completely changed to an execution state of the application program, a change is made to a screen based on the processing currently in execution. However, the screen image read from the application-screen storage section 109 and the screen image when the execution of the application program is restarted are the same, and thus the user basically does not recognize the change.

In this regard, the deletion of the image, etc., from the memory in step S23 may not be carried out immediately. That is to say, if the application-screen storage section 109 has a sufficient capacity so as to allow storing screen images of a plurality of applications, the image, etc., may be saved without deleting it.

Next, an example of display when applications are changed in this manner is shown in FIGS. 7A, 7B, and 7C. In this case, the case in which there are a plurality of applications that have been paused, and an operation has been performed to change display by the user touching on the touch panel 101 is shown. The display-change operation here is an example of the case in which the user has touched on the touch panel 101 by a finger F, and then moved the finger F from right to left as shown by an arrow m in FIG. 7.

In this case, it is assumed that a standby application screen is displayed in the first place. At this time, for example as shown in FIG. 7A, the screen becomes a halfway screen 11a in which a standby-application screen is shifted to the left side with the operation of the finger, and the left end of the screen 12a of the application to be restarted is displayed on the remaining display screen. Here, it is assumed that the application to be started is an address-book application. And the display area of the address-book application screen is gradually increased, resulting in the screen display of the address-book application in FIG. 2B. In the state in which the address-book application screen is fully displayed as shown in FIG. 2B, the address-book application is changed to an execution state.

It is assumed that the user further touched the touch panel 101 with the user's finger F in that state, and moved the finger F from right to left as shown by the arrow m. At this time, it is assumed that there is a mail application as another pause-state application. At this time, as shown in FIG. 7B, the screen becomes a halfway screen 12b in which the screen of the address-book application has been slid to the left side, and the left end of the screen 13a of the mail application to be restarted is displayed on the remaining display screen. And the display area of the mail application screen is gradually increased, resulting in the screen display of the mail application in FIG. 2C. In the state in which the mail application screen is fully displayed as shown in FIG. 2C, the mail application is changed to an execution state.

It is assumed that the user further touched the touch panel 101 with the user's finger F, and moved the finger F from right to left as shown by the arrow m. At this time, it is assumed that there is an application of transfer search on the Internet as another pause-state application. At this time, as shown in FIG. 7C, the screen becomes a halfway screen 13b in which the screen of the mail application has been slid to the left side, and the left end of the screen 14a of the transfer search application to be restarted is displayed on the remaining display screen. And the display area of the transfer search application screen is gradually increased, resulting in the screen display of the transfer search application in FIG. 2D. In the state in which the transfer search application screen is fully displayed as shown in FIG. 2D, the transfer search application is changed to an execution state.

In this manner, only by touching the touch panel 101 and moving laterally, that is to say, only by performing scroll operation, it becomes possible to change applications from a pause state to a restart state one after another. In this case, it looks to the user that a plurality of applications are invoked one after another. However, in reality, only the application displayed is in an execution state, and the other applications are in a pause state. Accordingly, it becomes not necessary for the control section in the terminal apparatus to simultaneously execute a plurality of applications, and thus the load of the functional section performing applications in the terminal apparatus decreases.

In this regard, in the case of changing applications one after another as shown in FIG. 7, the order of restarting applications is determined such that for example, an application having a screen image newly stored in the memory (lastly stored) is displayed ahead of the others.

Figure 8:
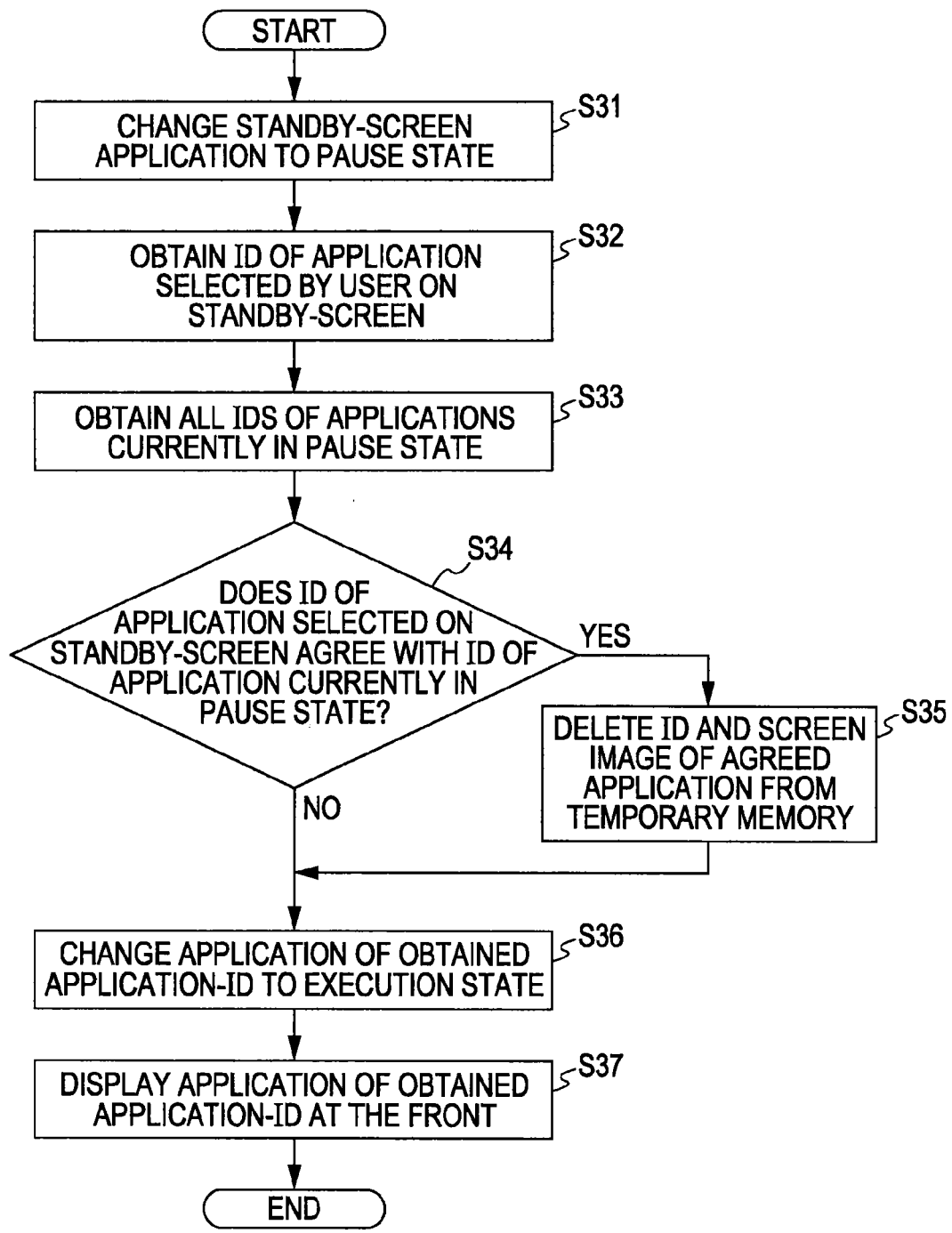
FIG. 8 is a flowchart illustrating an example of processing at the time of transition into an executable state by operating a function button on a standby screen according to an embodiment of the present invention.

Next, with reference to a flowchart in FIG. 8, a description will be given of a processing example at the time of each application program going to an execution state in a state of displaying a standby screen when the user selects an application to be executed by directly performing touch-panel operation, etc.

In this case, first, a standby-screen application is changed to a pause state (step S31). And an ID of the application selected by the user operation is obtained (step S32). After that, all the IDs of the currently pause-state application are obtained from the memory (step S33), and a determination is made on whether the ID of the application that the user selected at the time of displaying the standby screen agrees with the ID of the application currently being paused (step S34). Here, if there is a matched ID, the screen image thereof is read, the screen image and the ID are deleted, and the read screen image is displayed (step S35). Also, if there is no matching ID, the instructed application program is started.

And if displayed in step S35, the application program is restarted in an executable state from the display state (step S36). In step S34, if there is no matching ID, the processing directly proceeds to step S36, and the instructed application program is started.

And the execution screen of the started application program is displayed at the front of the screen (step S37). Accordingly, if an application has been paused, the application is restarted from the pause state, and if an application has not been paused, the initial screen of the application is displayed.

In this manner, even when an operation directly selecting an application is performed, if there is a history having paused an application, the application is restarted from the pause state. Otherwise, display is carried out from an initial screen of the selected application.

Figure 9:
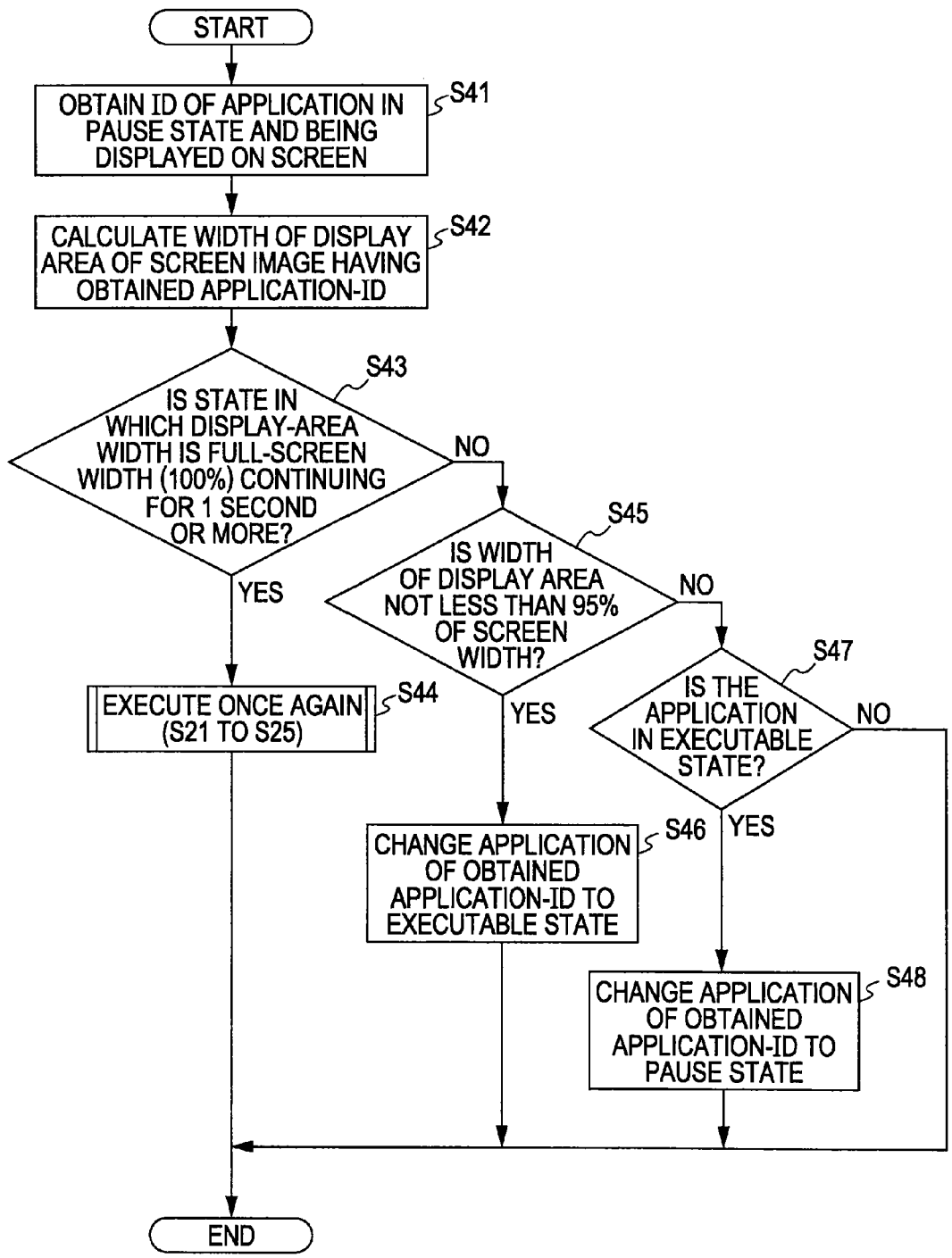
FIG. 9 is a flowchart illustrating an example of state-transition processing of an application being paused by a screen-scroll operation according to an embodiment of the present invention.
Figure 10A:
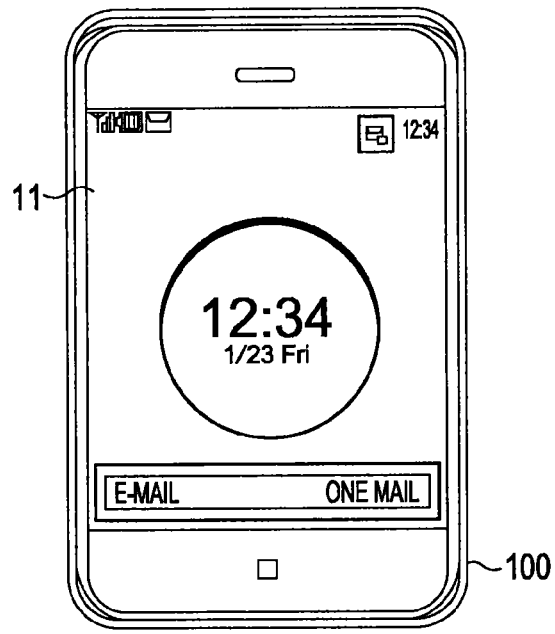
FIGS. 10A and 10B are explanatory diagrams illustrating a relationship between screen transition and state transition according to an embodiment of the present invention.
Figure 10B:
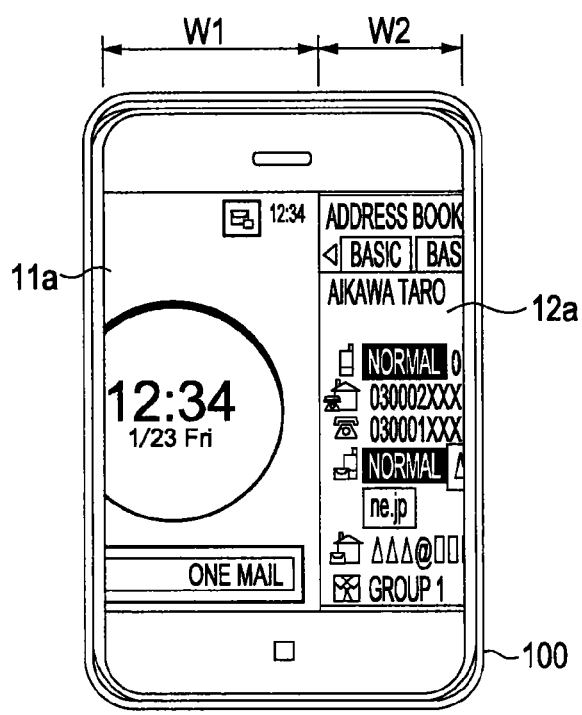

Next, with reference to a flowchart in FIG. 9, a description will be given of a detailed example of exchange processing state of application being paused at the time of the scroll operation of the screens shown in FIGS. 7A, 7B, and 7C.

First, an ID of an application in a pause state and being displayed on the screen is obtained (step S41). And a current display width of the display screen of the screen image of the obtained application ID is calculated (step S42). The display width is explained as follows. For example, when a lateral scroll operation is performed from the state of displaying a standby screen shown in FIG. 10A to a halfway-change screen shown in FIG. 10B, the width of the standby screen 11a is W1, and the width of a newly displayed screen 12a is W2 on the halfway-change screen.

And a determination is made on whether a state in which a display-screen width is a full screen (that is to say, 100%) continues for one second or more (step S43). Here, if determined that the state continues for one second or more, processing (steps S11 to S25) to proceed to the execution state once again in the flowchart in FIG. 6 is performed, and the current state is changed to the execution state.

Also, if determined that the state of 100% is not continuing for one second or more, a determination is made on whether the display-screen width is 95% or more (step S45). Here, if 95% or more, the application of the obtained application ID is changed to an executable state (step S46).

Also, in step S45, if not 95% or more, a determination is made on whether the application is currently in an executable state or not (step S47). Here, if determined to be in an executable state, the application of that application ID is changed to a pause state (step S48).

By processing in this manner, when a screen is scrolled, at the stage having a certain display width, that is to say, at the stage when a width W2 of a newly displayed screen becomes 95% in this example, the application changes to an executable state. Also, an application having a narrowing width is changed to a pause state.

Accordingly, the lateral scroll processing shown in FIG. 7 is preferably performed by repeating a change to an executable state and a change to a pause state. In this regard, 95% is one example. For example, a change may be made in a fully displayed state.

4. Variation 1

Next, a description will be given of a variation (example 1) of an embodiment of the present invention with reference to FIGS. 11A and 11B.

Figure 11A:
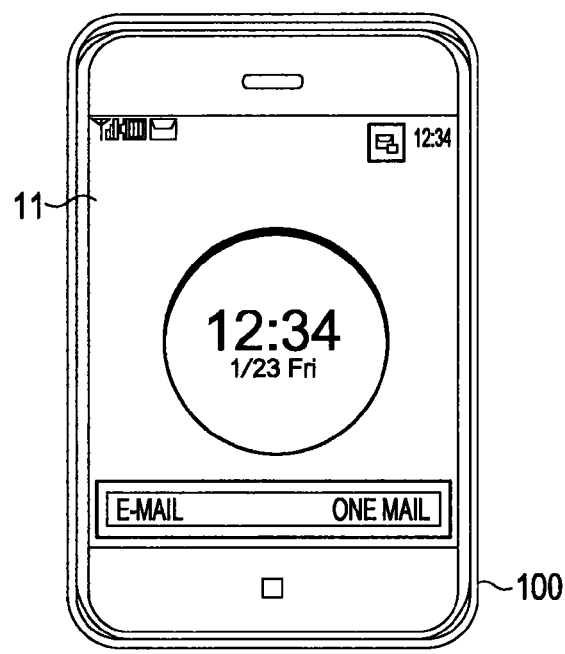
FIGS. 11A and 11B are explanatory diagrams illustrating an example of a shrunk and overlapped display according to a variation of an embodiment of the present invention.

In this example, for example, as shown in FIG. 11A, in a state of displaying a standby screen 11, when an application screen restarted from an pause state is displayed, the screen is displayed by overlapping the original application screen.

Figure 11B:
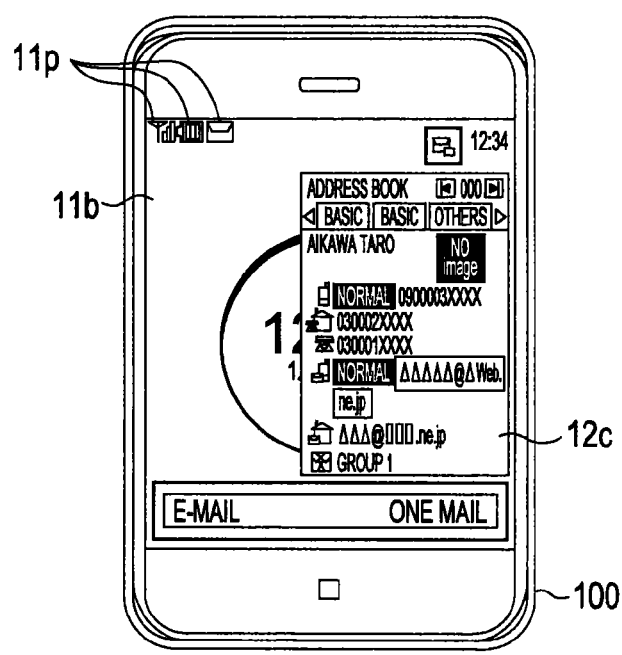

That is to say, as shown in FIG. 11B, an address-book screen 12c is shrunk and displayed on the standby screen 11b. From the display state shown in FIG. 11B, the address-book screen 12c may be changed to a full-screen display by some operation, such as tapping on the shrunk display. Even in a state in which a shrunk display is carried out, the application program of the address book is in an execution state. Alternatively, in a shrunk-display state, the program is kept as a pause state or an executable state. And the program may be changed to an execution state when a screen is fully displayed.

In this regard, in the shrunk-display state shown in FIG. 11B, a pictograph display 11p, such as a radio-wave reception state, an amount of remaining battery, a mail-reception state, etc., are preferably shrunk displayed in an unhidden state.

5. Variation 2

Also, a display direction may be set by determining the direction of the terminal apparatus 100 at the time of restarting an application.

Figure 12A:
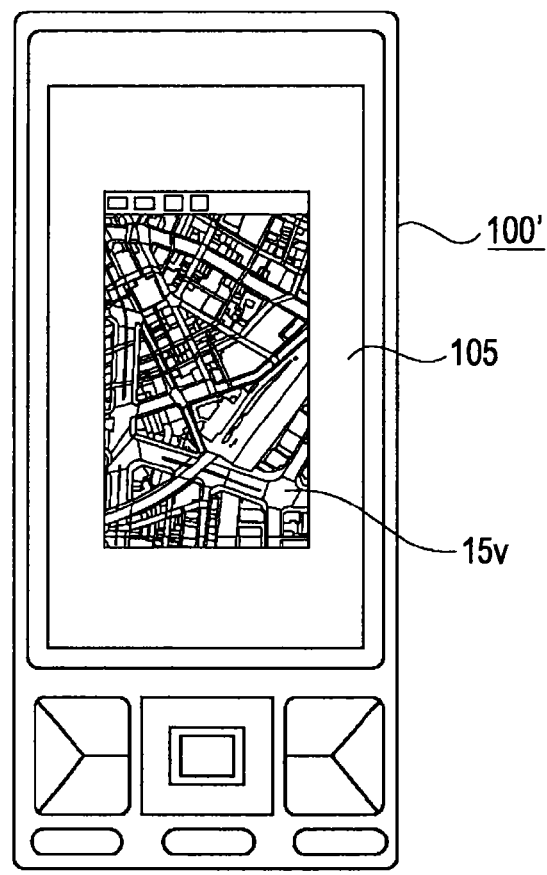
FIGS. 12A and 12B are explanatory diagrams illustrating an example of display processing on the basis of a direction of a terminal at the time of changing applications according to a variation of an embodiment of the present invention.

For example, it is assumed that an application being paused is a map-display application, and a terminal apparatus 100' has a configuration including a sensor detecting whether the main unit of the terminal is disposed horizontally or vertically. At this time, for example, if the terminal apparatus 100' is disposed vertically, as shown in FIG. 12A, the screen of the map-display application that is displayed on the display section 105 is determined to be a vertical display screen 15v.

Figure 12B:
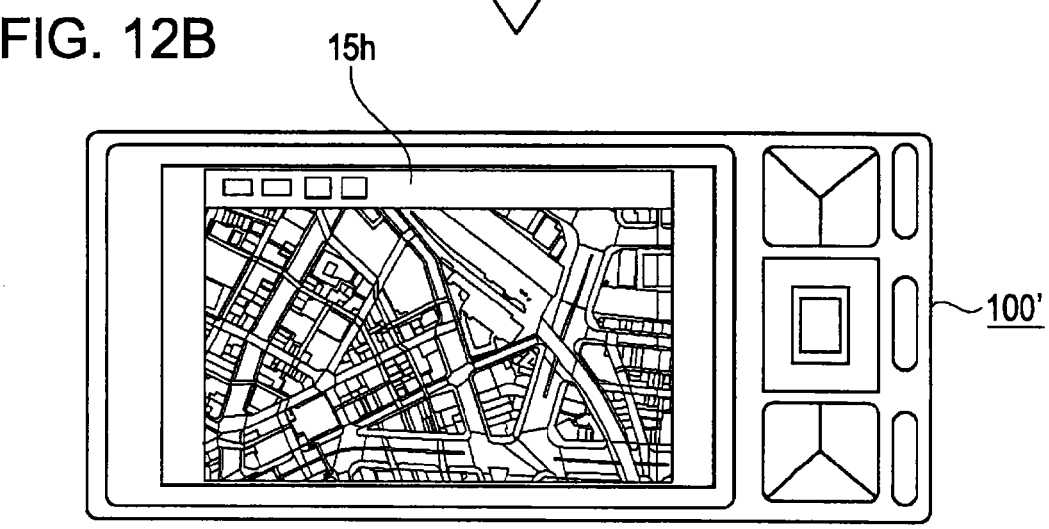

Also, for example, if the terminal apparatus 100' is disposed horizontally, as shown in FIG. 12B, the screen of the map-display application that is displayed on the display section 105 is determined to be a horizontal display screen 15h.

In this case, for example, the screen image of the horizontal display screen 15h is stored in the memory, and the vertical display screen 15v is created by transforming or extracting the stored screen image.

6. Variation 3

Figure 13:
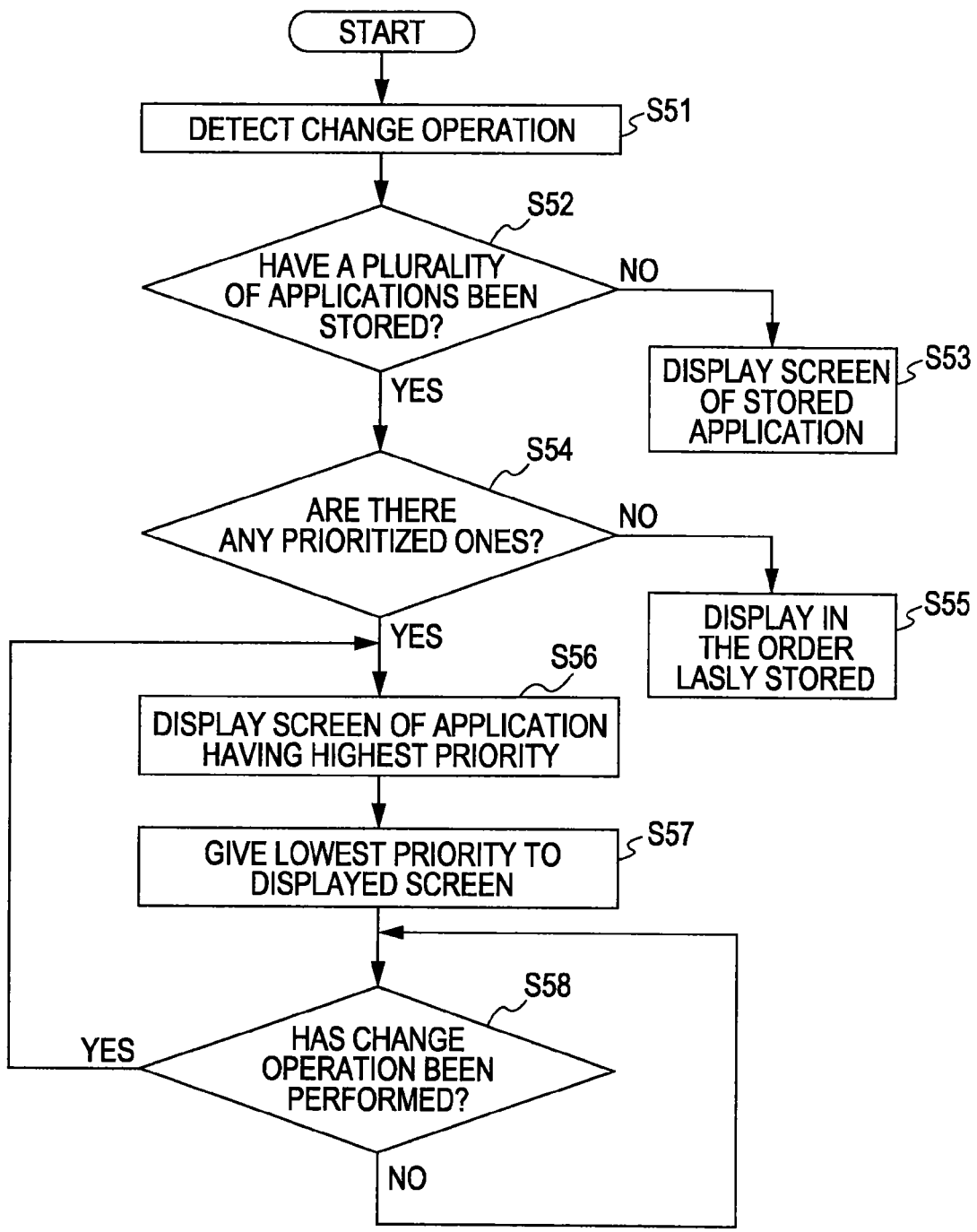
FIG. 13 is a flowchart illustrating an example of selection processing of a display application by priority according to a variation of an embodiment of the present invention.

A processing flowchart in FIG. 13 is an example in which if there are a plurality of paused applications, the order of display is determined by a priority given for each application. That is to say, in the above-described example, applications are displayed in chronological order of newly paused applications. However, applications may be displayed by the priority determined in advance.

A description will be given of the processing in FIG. 13. First, if an application-change operation is detected (step S51), and a determination is made on whether a plurality of applications have been stored as paused applications (step S52). Here, if there is only one application, the processing proceeds to display processing of the screen image of the stored one application (step S53).

And if there are a plurality of paused applications, a determination is made on whether there are paused applications to which priorities have been given (step S54). If there is no application to which a priority has been given, processing to display in the order of the lastly stored screen image is performed (step S55). This processing has been already described.

And if priorities are given, a screen image of an application having a highest priority is displayed, and the application is changed to an executable state (step S56). And here, the displayed application is changed to have a lowest priority (step S57).

After that, a determination is made on whether a change operation has been performed (step S58). At that point in time, a change is made to an application having the highest priority. However, here, an application whose priority has been lowered is reset, for example, by standby-screen display, etc.

Other Variations

In this regard, in the above-described embodiment, an example is taken of the case in which the present invention is applied to a mobile-telephone terminal apparatus. However, the present invention may be applied to the other various kinds of terminal apparatuses. For example, the present invention can be applied to an audio-playback apparatus, a video playback apparatus, an information processing terminal, etc., that are capable of processing in accordance with an installed application program. In this case, processing in terminal apparatus, according to the present invention, is made in the form of a program (software). By installing this program in the terminal apparatus, a terminal apparatus according to the present invention may be achieved.

Also, in above-described embodiment, a description has been given of processing in which application programs are changed by the user operation on the touch panel of the terminal apparatus. However, same processing may be performed by the operation of the other means. For example, as an operation section, a so-called jog dial having a rotation operation section, etc., may be used. When rotation operation thereof is performed, applications may be changed one after another in accordance with the amount of rotation.

Also, in the above-described embodiment, the screen image to be captured before pause and stored into the memory is the screen immediately before the pause. However, an initial screen of that application may be captured and stored into the memory. In this case, the initial screen is also displayed at restart time.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus comprising:
a microphone configured to detect an audio signal;
a touch panel display configured to detect an external it; and
circuitry configured to:
store a plurality of application programs each having computer readable instructions, said plurality of application programs including a first application program and a second application program;
execute instructions of the first application program;
display a screen generated by the circuitry on the touch panel display when executing the first application program;
store data on the first application program when an operation of the first application program is paused; and
respond to the external input by changing the screen to a screen image of the second application program, said external input including a dragging operation of an external device on the touch panel display so as to pause the first application program, wherein
in response to the circuitry receiving the external input, the circuitry causes image data generated for the first application program while being executed and data of an execution state of the first application program to be stored for subsequent retrieval when resuming execution of said first application program into the circuit,
the circuitry simultaneously displays a partial screen image for the first application program with a partial screen image of the second application program prior to fully transitioning to a display of an entirety of the screen image for the second application program,
the circuitry gradually increases a display area of the screen image for the second application program in accordance with the dragging operation, and
the circuitry places the second application program into an execution state when the display area of the screen image for the second application program is more than a predetermined threshold ;
wherein: said plurality of application programs have respective priorities assigned thereto, and in response to said external input, screen images for said plurality of application programs that are in one of a paused state and an execution state are displayed in priority order.

2. The apparatus of claim 1, wherein:
when the circuitry receives an external input signal indicating a change to a display of the image data generated for the first application program while in execution, the circuitry responds by changing a currently displayed screen to the screen of the first application program, the screen of the first application program representing one of an initial screen image of the first application program and a screen image of a state of execution at a time when said circuitry caused said image data generated for the first application program to be stored.

3. The apparatus claim 1, wherein:
the circuitry executes instructions for said second application program when the circuitry responds to said external input by placing said second application program into an execution state.

4. The apparatus of claim 3, wherein:
the circuitry continues execution of instructions of said first application program after the circuitry causes the circuitry to begin execution of instructions for said second application program.

5. The apparatus of claim 3, wherein:
when the circuitry executes the instructions for the second application program, the first application program changes to a paused state, and the circuitry displays the screen image for the second application program while in an execution state.

6. The apparatus of claim 1, wherein:
in response to said external input, respective screen images of said plurality of application programs that have been paused are displayed in an order by which said plurality of application programs were paused.

7. The apparatus of claim 1, wherein:
respective screen images of said plurality of application programs that have been paused are displayed in a reverse order in which said plurality of application programs were paused.

8. The apparatus of claim 1, wherein:
the external device includes a finger.

9. The apparatus of claim 1, wherein:
the circuitry places the second application program into the execution state when a width of the display area of the screen image for the second application program is more than a predetermined threshold.

10. The apparatus of claim 1, wherein,
in a case that another external input is not detected by the circuitry within a predetermined time period of displaying the entirety of the screen image for the second application program, the circuitry begins execution f the second application program, and
in a case that the another external input is detected by the circuitry within the predetermined time period, the circuitry does not begin execution of the second application program and the circuitry subsequently begins execution of a different application program.

11. A method for controlling a terminal apparatus that manages a plurality of application programs, comprising;
detecting, using a microphone, an audio signal;
detecting, using a touch panel display, an external input;
storing in a non-transitory computer readable medium a plurality of application programs each having computer readable instructions, said plurality of application programs including a first application program and a second application program;
executing, using circuitry, instructions of the first application program so as to put the first application program in an execution state;
displaying, on the touch panel display, a screen image for the first application program in the execution state;
storing, in the circuitry, data on the first application program when an operation of the first application program is paused;
receiving the external input to change an operation to a second application program, said external input including a dragging operation of an external device on the touch panel display so as to pause the first application program;
responding to the external input by changing the screen image on the display to a screen image of the second application program;
in response to the external input, storing in the circuitry image data generated for the first application program while being executed and data of an execution state of the first application program for subsequent retrieval and display in response to another external input when resuming execution of said first application program;
simultaneously displaying a partial screen image for the first application program with a partial screen image of the second application program prior to fully transitioning to a display of an entirety of the screen image for the second application program;
gradually increasing a display area of the screen image for the second application program in accordance with the dragging operation; and
placing the second application program into an execution state when the display area of the screen image for the second application program is more than a predetermined threshold;

wherein: said plurality of application programs have respective priorities assigned thereto, and in response to said external input, screen images for said plurality of application programs that are in one of a paused state and an execution state are displayed in priority order.

12. The method of claim 11, wherein:
said responding includes changing the screen image to the screen image of the first application program, the screen image of the first application program representing one of an initial screen image of the first application program and a screen image of the execution state at a time when the circuitry caused said image data generated for the first application program to be stored.

13. The method of claim 11, further comprising:
executing, using the circuitry, instructions for said second application program after said responding so as to place said second application program into an execution state.

14. The method of claim 13, wherein:
the circuitry continues execution of instructions of said first application program after the circuitry begins execution of instructions for said second application program.

15. The method of claim 13, wherein:
when the circuitry executes the instructions for the second application program, the first application program changes to a paused state, and the display displays a screen image for the second application program while in the execution state.

16. The method of claim 15, wherein:
said plurality of application programs have respective priorities assigned thereto, and in response to said external input, images for said plurality of application programs that are in one of a paused state and an execution state are presented on said display in priority order.

17. The method of claim 11, wherein:
in response to receiving said external input, respective screens of said plurality of application programs that have been paused are displayed in an order by which said plurality of application programs were paused.

18. The method of claim 11, wherein:
in response to receiving said external input, respective screen images of said plurality of application programs that have been paused are displayed in a reverse order in which said plurality of application programs were paused.

19. The method of claim 11, wherein:
the external device includes a finger.

20. The method of claim 11, wherein:
said placing places the second application program into the execution state when a width of the display area of the screen image for the second application program is more than a predetermined threshold.

21. The method of claim 11, further comprising:
in a case that another external input is not detected by the circuitry within a predetermined time period of displaying the entirety of the screen image for the second application program, beginning execution of the second application program; and
in a case that the another external input is detected by the circuitry within the predetermined time period, not beginning execution of the second application program and subsequently beginning execution of a different application program.

22. A terminal apparatus comprising:
a microphone configured to detect an audio signal;
a touch panel display configured to detect an a input; and
circuitry configured to:
  store a plurality of application programs each having computer readable instructions, said plurality of application programs including a first application program and a second application program;
  execute instructions of the first application program;
  display a screen generated by the circuitry on the touch panel display when executing the first application program;
  store data on the first application program when an operation of the first application program is paused; and
  respond to the external input by changing the screen to a screen image of the second application program, said external input including a touching operation of an external device on the touch panel display so as to pause the first application program, wherein
in response to the circuitry receiving the external input, the circuitry causes image data generated for the first application program while being executed and data of an execution state of the first application program to be stored for subsequent retrieval when resuming execution of said first application program into the circuitry,
the circuitry simultaneously displays a partial screen image for the first application program with a partial screen image of the second application program prior to fully transitioning to a display of an entirety of the screen age for the second application program,
the circuitry gradually increases a display area of the screen image for the second application program m accordance with the touching operation, and
to the circuitry places the second application program into an execution state when the display area of the screen image for the second application program is more that predetermined threshold;
wherein: said plurality of application programs have respective priorities assigned thereto, and in response to said external input, screen images for said plurality of application programs that are in one of a paused state and an execution state are displayed in priority order.

23. The apparatus of claim 22, wherein
in a case that another external input is not detected by the circuitry within a predetermined time period of displaying the entirety of the screen image for the second application program, the circuitry begins execution of the second application program, and
in a case that the another external input is detected by the circuitry within the predetermined time period, the circuitry does not begin execution of the second application program and the circuitry subsequently begins execution of a different application program.

* * * * *